United States Patent
Hosseinipour et al.

(10) Patent No.: US 10,061,722 B2
(45) Date of Patent: Aug. 28, 2018

(54) METHOD TO HANDLE CONCURRENT FATAL EVENTS IN A MULTICORE EXECUTION ENVIRONMENT

(71) Applicant: QUALCOMM Incorporated, San Diego, CA (US)

(72) Inventors: Afshin Hosseinipour, San Diego, CA (US); Forrest McDonald, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 15/295,870

(22) Filed: Oct. 17, 2016

(65) Prior Publication Data
US 2018/0107618 A1    Apr. 19, 2018

(51) Int. Cl.
*G06F 13/24*    (2006.01)
*G06F 11/07*    (2006.01)

(52) U.S. Cl.
CPC .......... *G06F 13/24* (2013.01); *G06F 11/0724* (2013.01); *G06F 11/0772* (2013.01); *G06F 11/0787* (2013.01)

(58) Field of Classification Search
CPC .... G06F 13/24; G06F 9/4812; G06F 11/0787; G06F 11/0772
See application file for complete search history.

(56) References Cited

U.S. PATENT DOCUMENTS

| | | |
|---|---|---|
| 9,389,942 B2 | 7/2016 | Raj et al. |
| 2014/0006877 A1 | 1/2014 | Zhu et al. |
| 2014/0281092 A1 | 9/2014 | Jayakumar et al. |
| 2015/0067215 A1 | 3/2015 | Henry et al. |
| 2016/0055262 A1 | 2/2016 | Bhattacharjee et al. |
| 2016/0092382 A1 | 3/2016 | Anvin et al. |
| 2016/0119180 A1 | 4/2016 | Tsai |
| 2016/0224442 A1 | 8/2016 | Sanghi et al. |

OTHER PUBLICATIONS

International Search Report and Written Opinion—PCT/US2017/049275—ISA/EPO—dated Nov. 16, 2017.

*Primary Examiner* — Ernest Unelus
(74) *Attorney, Agent, or Firm* — Hunter Clark PLLC

(57) ABSTRACT

Techniques for handling concurrent fatal events in a multi-core execution environment are described. An example method for handling interrupts in a processor controlled device includes receiving an indication of a first fatal interrupt, determining if additional interrupts have occurred, serializing the handling of the first fatal interrupt and the additional interrupts, storing a serialized diagnostic information corresponding to each of the first fatal interrupt and the additional interrupts, and resetting the processor controlled device after storing the serialized diagnostic information corresponding to each of the first fatal interrupt and the additional interrupts.

23 Claims, 8 Drawing Sheets

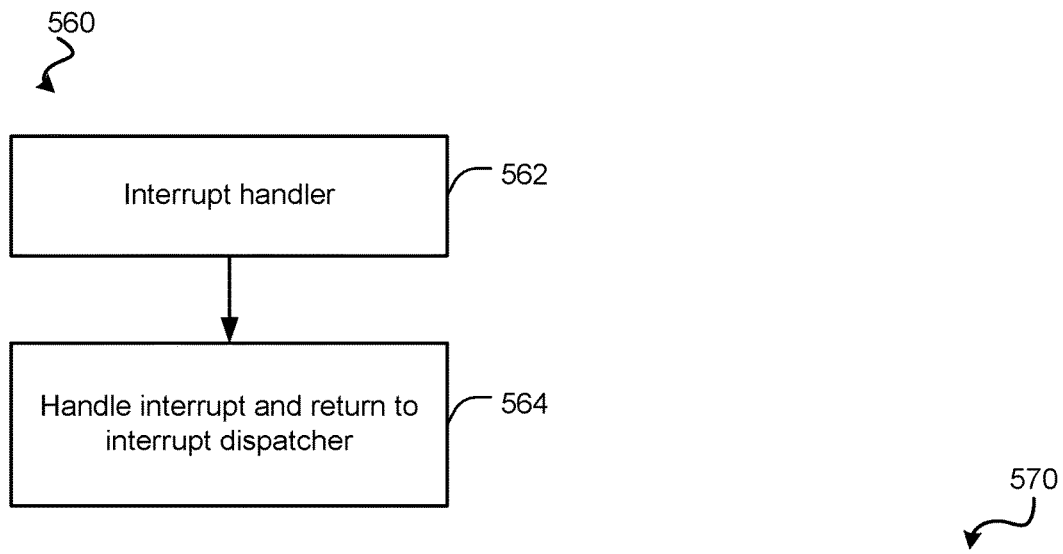
FIG. 5C
FIG. 5D
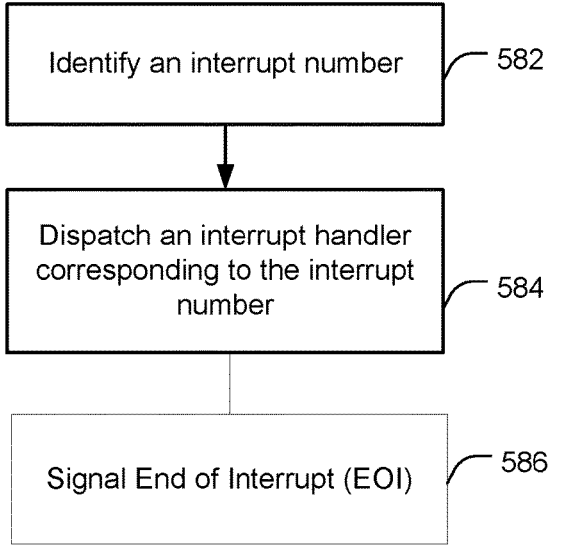
FIG. 5E

METHOD TO HANDLE CONCURRENT FATAL EVENTS IN A MULTICORE EXECUTION ENVIRONMENT

BACKGROUND

An aspect of this invention generally relates to data processing devices and more particularly to fatal interrupt handling in a multicore execution environment.

The security and reliability of an operating system within a data processing device is an increasingly important concern. System-On-Chip (SoC) and integrated circuit (IC) designs are increasingly complex, and more and more processors are integrated into SoCs/ICs to perform increasingly varying and complex functionalities. Also, multiple SoCs/ICs are commonly linked together for advanced applications. Multiple processors/SoCs/ICs can be involved in performing certain tasks, and each processor/SoC/IC can be dependent on one or more others to complete the tasks. During development for a SoC device, and potentially after release, errors in the software or hardware may cause instabilities in the operation of the SoC device. For example, the software or hardware may cause a fatal event to occur on one or more processors which will result in resetting the SoC device. Fatal events are typically triggered by access violations, bus errors, software asserts, but other software or hardware issues may trigger a fatal event.

In a multicore environment, multiple fatal events may occur simultaneously either synchronously or asynchronously. In general, hardware fatal events are handled as a Central Processing Unit (CPU) interrupt and software fatal events are handled by the CPU as software exceptions. Upon encountering a fatal error, the SoC device may be configured to dispatch a handler for the fatal event. The handler may save device information associated with the context of the SoC device. The handler may attempt to restore the context of the device prior to resetting the device. In a multicore processor, the handler may halt the processing on other CPUs and instruct them to dump their contexts. Resetting the device with no coordination with other CPUs may produce operational issues such as deadlock or incomplete diagnostic information if other CPUs are handling one or more simultaneous errors.

SUMMARY

An example method for handling interrupts in a processor controlled device according to the disclosure includes receiving an indication of a first fatal interrupt, determining if additional interrupts have occurred, serializing the handling of the first fatal interrupt and the additional interrupts, storing a serialized diagnostic information corresponding to each of the first fatal interrupt and the additional interrupts, and resetting the processor controlled device after storing the serialized diagnostic information corresponding to each of the first fatal interrupt and the additional interrupts.

Implementations of such a method may include one or more of the following features. The first fatal interrupt may be a hardware interrupt or a software exception. The first fatal interrupt may trigger the additional interrupts. The processor controlled device may include a multicore processor with a plurality of cores. Each of the plurality of cores may be placed in a spin state prior to resetting the processor controlled device. Storing the serialized diagnostic information corresponding to each of the first fatal interrupt and the additional interrupts may include storing the serialized diagnostic information for each of the plurality of cores. The serialized diagnostic information may include an interrupt number and a processor number.

An example of a system for handling a fatal interrupt in a multicore processor according to the disclosure includes a memory, a plurality of cores, an interrupt controller operably coupled to the memory and each of the plurality of cores, such that at least one of the plurality of cores and the interrupt controller are configured to receive an indication of a first fatal interrupt, determine if additional interrupts have occurred, serialize the handling of the first fatal interrupt and the additional interrupts, store a serialized diagnostic information corresponding to each of the first fatal interrupt and the additional interrupts in the memory, and reset the multicore processor after storing the serialized diagnostic information corresponding to each of the first fatal interrupt and the additional interrupts.

Implementations of such a system may include one or more of the following features. The first fatal interrupt is may be hardware interrupt or a software exception. The first fatal interrupt may trigger the additional interrupts. Each of the plurality of cores may be placed in a spin state prior to resetting the multicore processor. The system may include a debug and trace module configured to store the serialized diagnostic information corresponding to each of the first fatal interrupt and the additional interrupts for each of the plurality of cores. The serialized diagnostic information includes an interrupt number and a processor number.

An example of an apparatus for handling interrupts in a processor controlled device according to the disclosure includes means for receiving an indication of a first fatal interrupt, means for determining if additional interrupts have occurred, means for serializing the handling of the first fatal interrupt and the additional interrupts, means for storing a serialized diagnostic information corresponding to each of the first fatal interrupt and the additional interrupts, and means for resetting the processor controlled device after storing the serialized diagnostic information corresponding to each of the first fatal interrupt and the additional interrupts.

An example of a non-transitory processor-readable storage medium comprising processor-readable instructions configured to cause a processor controlled device to handle interrupts according to the disclosure includes code for receiving an indication of a first fatal interrupt, code for determining if additional interrupts have occurred, code for serializing the handling of the first fatal interrupt and the additional interrupts, code for storing a serialized diagnostic information corresponding to each of the first fatal interrupt and the additional interrupts, and code for resetting the processor controlled device after storing the serialized diagnostic information corresponding to each of the first fatal interrupt and the additional interrupts.

Implementations of such a non-transitory processor-readable storage medium may include one or more of the following features. The first fatal interrupt may be a hardware interrupt or a software exception. The first fatal interrupt may trigger the additional interrupts. The processor controlled device may include a multicore processor with a plurality of cores. The plurality of cores may be placed in a spin state prior to resetting the processor controlled device. The code for storing the serialized diagnostic information corresponding to each of the first fatal interrupt and the additional interrupts may include code for storing the serialized diagnostic information for each of the plurality of cores. The serialized diagnostic information may include an interrupt number and a processor number.

Items and/or techniques described herein may provide one or more of the following capabilities and/or possibly one or more other capabilities not mentioned. One or more fatal errors may occur on one or more processors in a multicore execution environment. The fatal errors may be asynchronous. All of the one or more fatal events may be handled before a device is reset. Diagnostic logs associated with each of the fatal events may be updated before the reset. The fatal event handling may be serialized in an interrupt handling framework across all cores. Errors and confusion due to interleaved diagnostic logs may be reduced. Software fatal exceptions may generate interrupts that may be handled in the interrupt context. The potential of software interlock caused by handling simultaneous hardware and software fatal errors may be reduced. Further, it may be possible for an effect noted above to be achieved by means other than they noted and a noted item/technique may not necessarily yield the noted effect. Other capabilities may be provided and not every implementation according to the disclosure must provide any, let alone all, of the capabilities discussed.

BRIEF DESCRIPTION OF THE DRAWINGS

FIGS. 5A-5E is a flow diagram of a process for handling concurrent fatal events in a multicore secure execution environment.

DETAILED DESCRIPTION

Figure 1:
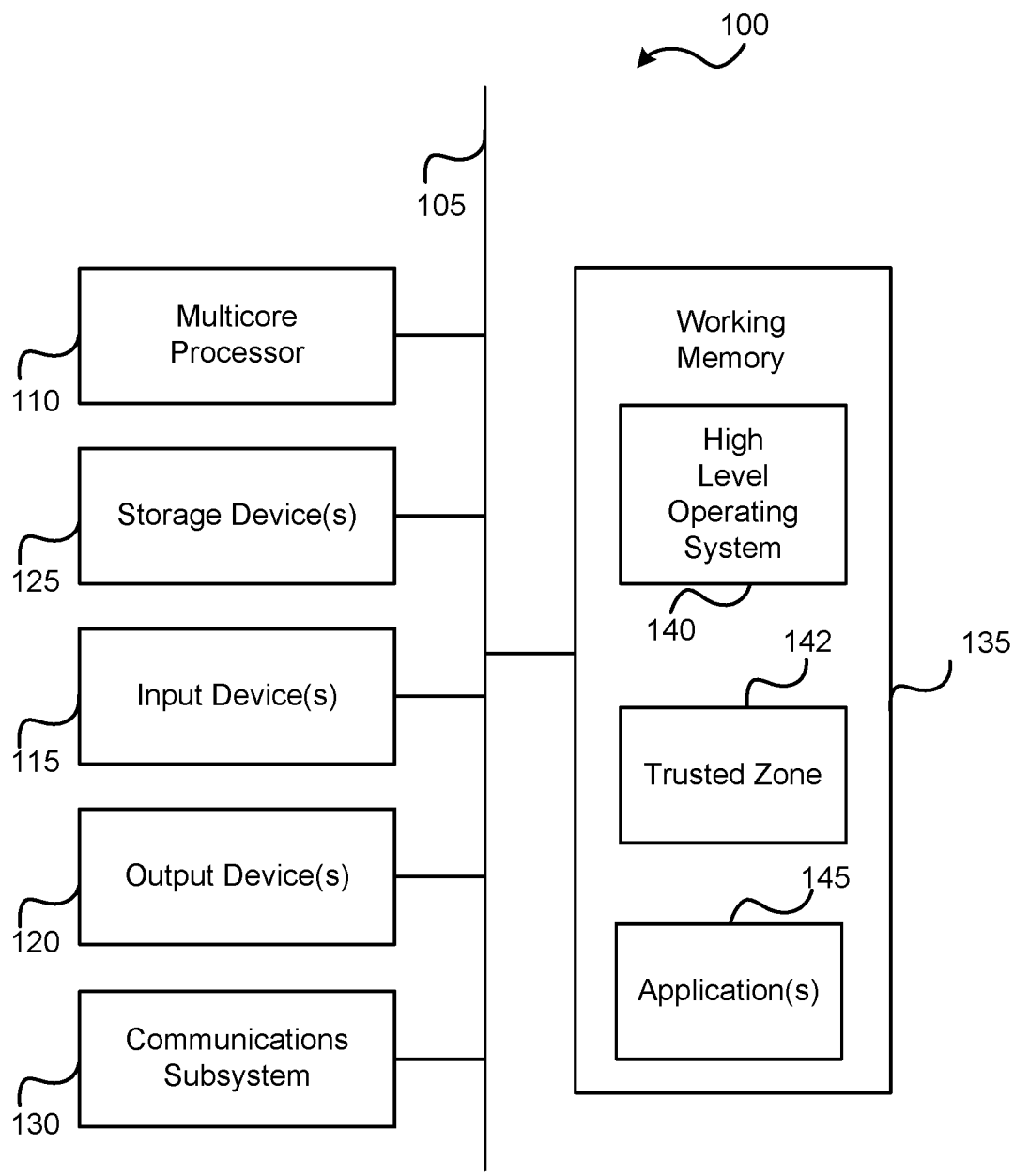
FIG. 1 is a functional block diagram of an example computer system utilizing a multicore processor.

Techniques disclosed herein are configured to handle concurrent fatal events in a multicore processor. In mobile device with a multicore processor, fatal events such as access violations, bus errors, software asserts, and others may be handled in a non-secure execution environments (EE) or a secure execution environment (SEE) where details associated with the event are logged into a diagnostic buffer before the device is reset. Generally, fatal events may be triggered by interrupts associated with hardware (e.g., within the SoC), or generated by software (e.g., software asserts). After the device is reset, the device may go into a download mode to save the contents of the diagnostics buffer (e.g., a crash dump) for analysis. For example, diagnostic logs, contexts, etc. may be preserved across a reset (e.g. when the CPU resets the RAM contents stay the say). A download mode may occur after reset, and diagnostic logs and buffers may be saved (i.e. to persistent storage on a different computer) for analysis. As used herein, a crash dump means a process to store the contexts, diagnostic logs, and bookkeeping to some persistent medium to be used for further analysis by a programmer.

In the current software architecture of an EE or SEE, a first fatal event may cause the device to perform a crash dump and reset the device. This method of handling fatal events can result in incomplete diagnostic logs if there were multiple fatal events that were being handled by different cores. The saved diagnostic log may not reflect all pending and in flight fatal events (e.g., events that are currently being handled, but the handling is incomplete) since the device was reset while handling the first fatal event. This method of handling fatal events may also result in interleaved diagnostic logs due to the lack of serialization of handling each fatal event. Further, a lack of synchronization between software generated and interrupt driven fatal events may cause deadlock.

As a result of the incomplete and/or interleaved diagnostic logs and the issues caused by deadlock, a complete cycle of triaging, root cause analysis, testing, and bug fixing may become lengthy and expensive. A developer must try multiple engineering builds to achieve a log that accurately reflects the context of the crash dump for further triaging of an issue. In most cases, reproducing the test scenario is not easy since any differences in software or hardware may make it impossible to reproduce the scenario. In some cases, the crashes may only be reproducible within a specific OEM platform.

The method to handle concurrent fatal events in a multicore execution environment described herein corrects the deficiencies indicated above. In an example, a fatal interrupt handling loop may execute on a multicore processor to provide a consistent approach for handling both hardware and software fatal events. Software fatal exceptions (e.g., software asserts or other software related fatal events, NULL pointer dereference, uninitialized pointer dereference, illegal instruction, etc.) will trigger interrupts to be handled in the interrupt handling framework. Upon receiving an indication of a first fatal event (i.e., a hardware interrupt or a software exception that is being handled as an interrupt), the fatal interrupt handling loop will determine if there are any additional interrupts pending on any of the cores in the multicore processor. For example, a multicore architecture may include an interrupt handling framework which interfaces with an interrupt controller and is configured to receive interrupt information. The fatal interrupt handling loop may execute on a core to determine if any additional fatal events have occurred. The fatal interrupt handling loop is configured to serially handle pending fatal events and to invoke (dispatch) the interrupt handler for the specific interrupt. The interrupt handler is then configured to create the diagnostic logs. Handling the interrupts serially removes the confusion caused by interleaved diagnostic logs because the log information for each fatal interrupt is group in a serial sequence. After the interrupt handling framework handles all pending interrupts on all cores, a watchdog timer may reset the device. In this way, all of the fatal events may be handled before the device is reset.

Referring to FIG. 1, a functional block diagram of an example computer system 100 utilizing a multicore processor is shown. It should be noted that FIG. 1 is meant only to provide a generalized illustration of various components with an apparatus, any or all of which may be utilized as appropriate. FIG. 1, therefore, broadly illustrates how individual system elements may be implemented in a relatively separated or relatively more integrated manner.

The computer system 100 is shown comprising hardware elements that can be electrically coupled via a bus 105 (or may otherwise be in communication, as appropriate). The hardware elements may include a multicore processor 110, including without limitation one or more general-purpose processors and/or one or more special-purpose processors and/or peripherals (such as digital signal processing chips, graphics acceleration processors, and/or the like). The multicore processor 110 may include a Trusted Execution Environment (TEE) such as the ARM TrustZone® technology which may be integrated into the multicore processor 110. The computer system 100 may also include one or more input devices 115, which can include without limitation a mouse, a keyboard and/or the like; and one or more output devices 120, which can include without limitation a display device, a printer and/or the like.

The computer system 100 may further include (and/or be in communication with) one or more storage devices 125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 100 might also include a communications subsystem 130, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 130 may permit data to be exchanged with a network, other computer systems, and/or any other devices described herein. In many embodiments, the computer system 100 will further comprise a working memory 135, which can include a RAM or ROM device.

The computer system 100 also may comprise hardware and software elements, shown as being currently located within the working memory 135, including an stored High Level Operating System (HLOS) (e.g., iOS, Android, Windows, Linux), 140, a trusted zone 142, device drivers, executable libraries, and/or other code, such as one or more application programs 145, which may comprise computer programs provided by various embodiments, and/or may be designed to implement methods, and/or configure systems, provided by other embodiments, as described herein. The working memory 135 may be divided into multiple partitions such that functions and/or applications may persist within one or more of the partitions. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code may be stored on a computer-readable storage medium, such as the storage device(s) 125, or in the working memory 135. In some cases, the storage medium might be incorporated within a computer system, such as the computer system 100. For example, the working memory may include an Embedded Multi-Media Card (eMMC). The trusted zone 142 may work in conjunction with a secure environment such as the ARM TrustZone® technology. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 100 and/or might take the form of source and/or installable code, which, upon compilation and/or installation on the computer system 100 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Figure 2:
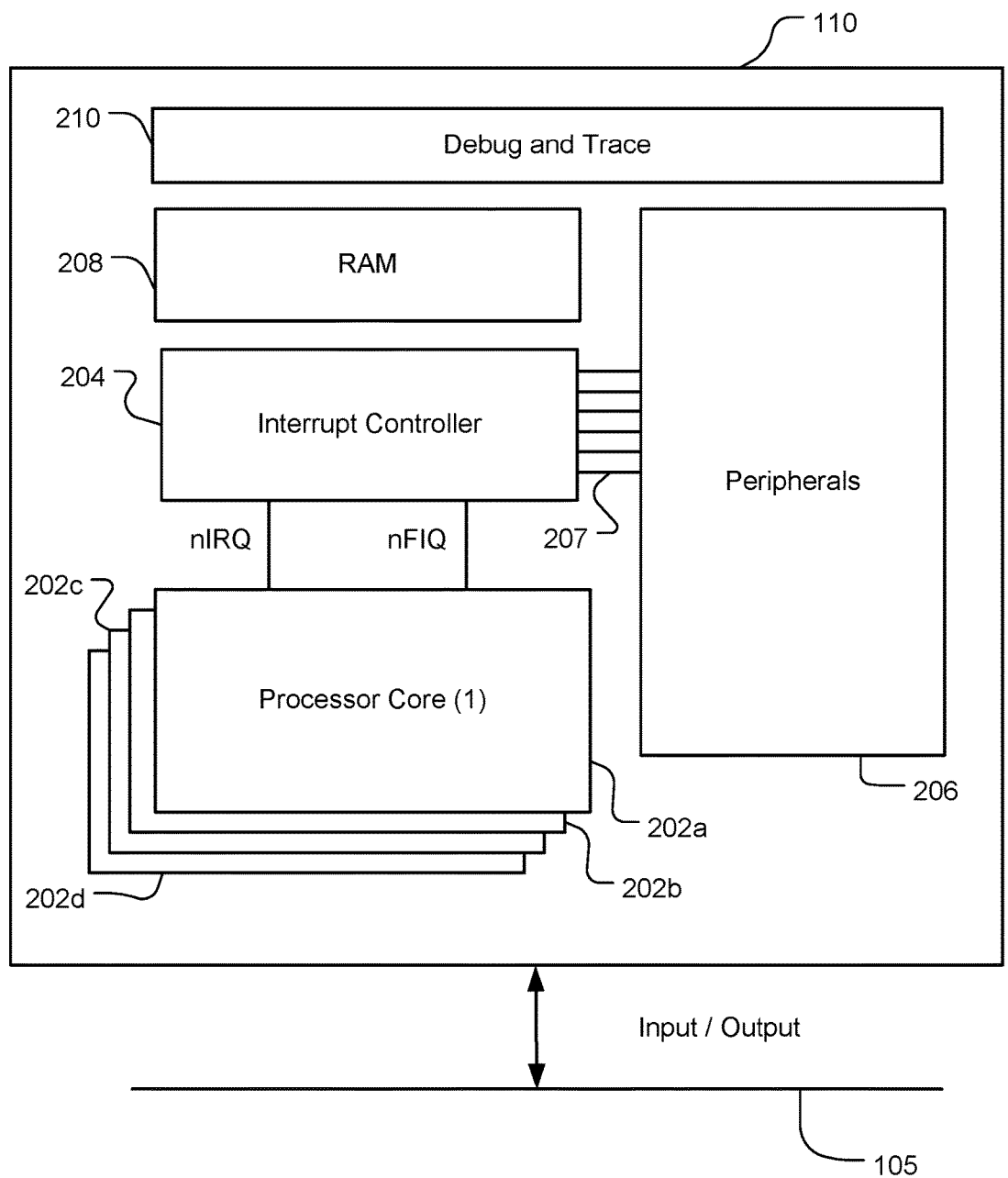
FIG. 2 is a block diagram of an example multicore processor.

Referring to FIG. 2, with further reference to FIG. 1, an example of a multicore processor 110 is shown. The multicore processor 110 includes a plurality of processor cores (i.e., cores) such as a first core 202a, a second core 202b, a third core 202c, and a fourth core 202d. The number of cores 202a-d is an example only, and not a limitation as a multicore processor 110 may have additional processors. In an example the multicore processor 110 may be an ARM® Corex® and the cores 202a-d may be ARMv7R 32 bit, Cortex A7 or A9 CPUs and corresponding floating-point units (FPUs), memory and cache units. Other processors and architectures may also be used. The cores 202a-d are operationally coupled to an interrupt controller 204 such as the ARM Generic Interrupt Controller (e.g., GIC v3 in the ARM v8 architecture). The interrupt controller 204 is configured to interrupt a core via interrupt requests (IRQ) (or Fast Interrupt request (FIQ) in an ARM CPU architecture), store pending hardware interrupts, and interface with cores 202a-d in order for the cores to determine an exact interrupt, check if there are more pending interrupts, and signal end of interrupt (EOI) for a given interrupt. The interrupt controller 204 is also coupled to one or more peripherals 206 such as memory controllers, graphics and codex accelerators, or other application-specific integrated circuits (ASICs) that may enhance the performance of the multicore processor 110. The peripherals 206 may provide hardware interrupt requests to the interrupt controller over the corresponding IRQ lines 207. The multicore processor 110 may include its own random access memory 208 and a debug and trace module 210 such as the ARM® CoreSight™ or other Mobile Industry Processor Interface (MIPI) debug architecture to enable system debugging and tracing operations. In an example, the multicore processor 110 may include other cryptographic processors and a secure execution environment (SEE) such as the integrated ARM TrustZone®. The multicore processor 110 may communicate with other elements in the computer system 100 via the bus 105. Other ports and communication paths may also be used.

The multicore processor 110 may include an interrupt handling framework configured to process the handling of interrupts from an initial hardware interrupt to resuming execution (or spinning for reset in the fatal error case). The interrupt handling framework may execute on any core 202a-d as soon as it receives an IRQ/FIQ from the interrupt controller 204. As will be described, the interrupt handling framework may include code configured as an interrupt dispatcher, an interrupt handler, and a fatal interrupt handling loop.

Figure 3:
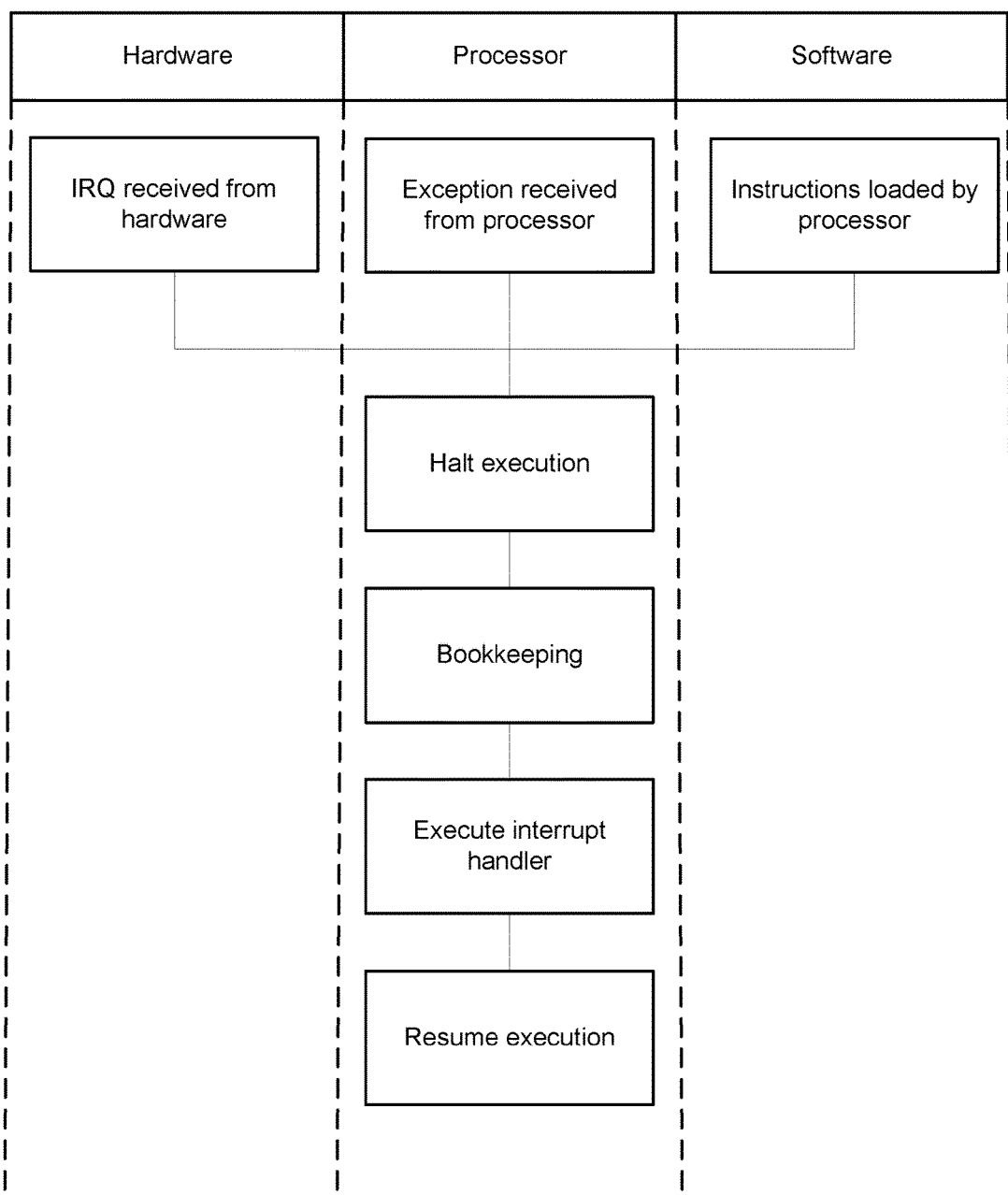
FIG. 3 is an example of an interrupt process.

Referring to FIG. 3, an example of a prior art interrupt process 300 is shown. In general, a processor receives a signal from hardware or software within a system to indicate that the respective hardware or software needs immediate attention. In the case of a hardware interrupt, a hardware component may send an interrupt to an interrupt controller within a processor to indicate a condition or event that needs immediate attention. The event may halt the current processing and the interrupt controller may execute an interrupt handling function. In the case of a software interrupt, an exception within the processor or an instruction received from another application may cause the processor to execute the interrupt handling function. In each scenario, the interrupt handler may halt currently executing software and then perform some bookkeeping to store information associated with the state of the hardware, software and the processor. For example, the bookkeeping may include saving one or more system state variables in memory. The processor may execute an interrupt handler to address the interrupting event. Each different interrupt may have an associated interrupt handler function. If the interrupt is non-fatal, the processor may resume execution when the execution interrupt handler function is complete. When the interrupt is associated with a fatal event, the processor may be configured to reset the device. Handling fatal interrupts in a multicore system, however, is more complex than process 300 because resetting the device based on asynchronous interrupts may impact operations on the other processor cores.

In a multicore system, hardware fatal events may occur concurrently within the different processor cores, or within software such as a software trap that cannot handle current program flow. The nature of hardware and software depends on the dynamic processing of the code and the current hardware configuration. These fatal interrupts in a multicore system occur typically asynchronously. In many cases, the asynchronous fatal interrupts create a deadlock condition within the system, or incomplete log entries when one or more interrupt handlers attempt any bookkeeping. Such incomplete logs increase the workload during system development because the incomplete logs impede the developers' ability to determine the nature of the error that caused the interrupt. This problem may be amplified if the source of the error is related to different OEM components in a system.

Some multicore systems are used to implement secure execution environments (SEEs). In such secure systems, some hardware blocks may trigger an interrupt if there is violation on the bus or if an attempt is made to access a secure memory within the SEE. In general, an objective of a SEE is to protect some memory address range in the memory by a hardware block. In this example, if an unauthorized system process attempts to initiates a transaction to access the portion of the secured memory, an access violation may be generated to inform the processor by initiating an interrupt. Such interrupts are typically fatal interrupts. In another example, if one of the processors tries to access a non-existing hardware block, or if the hardware block is not properly clocked, a bus error may be generated. Such bus errors may also be fatal interrupts. A software interrupt in a multicore system may be based on a software code flow with input validation processes, such as when an Application Programming Interface (API) is called. In this case, if the input validation fails (e.g., a NULL pointer check is missed), or there is a null pointer which cannot be handled by the processor, then it causes a type of assertion in the software. That assertion can be thought of as a software event and may lead to a fatal interrupt. These hardware and software interrupts may occur either synchronously or asynchronously. This means that in a multicore platform environment when one of the cores is running and encounters a software fatal event, another processor, for example, may be running and encounter an access violation. This access violation may then trigger a bus fault, which may create another fatal interrupt. Thus, multiple interrupts may be simultaneously pending on multiple processor cores.

Figure 4:
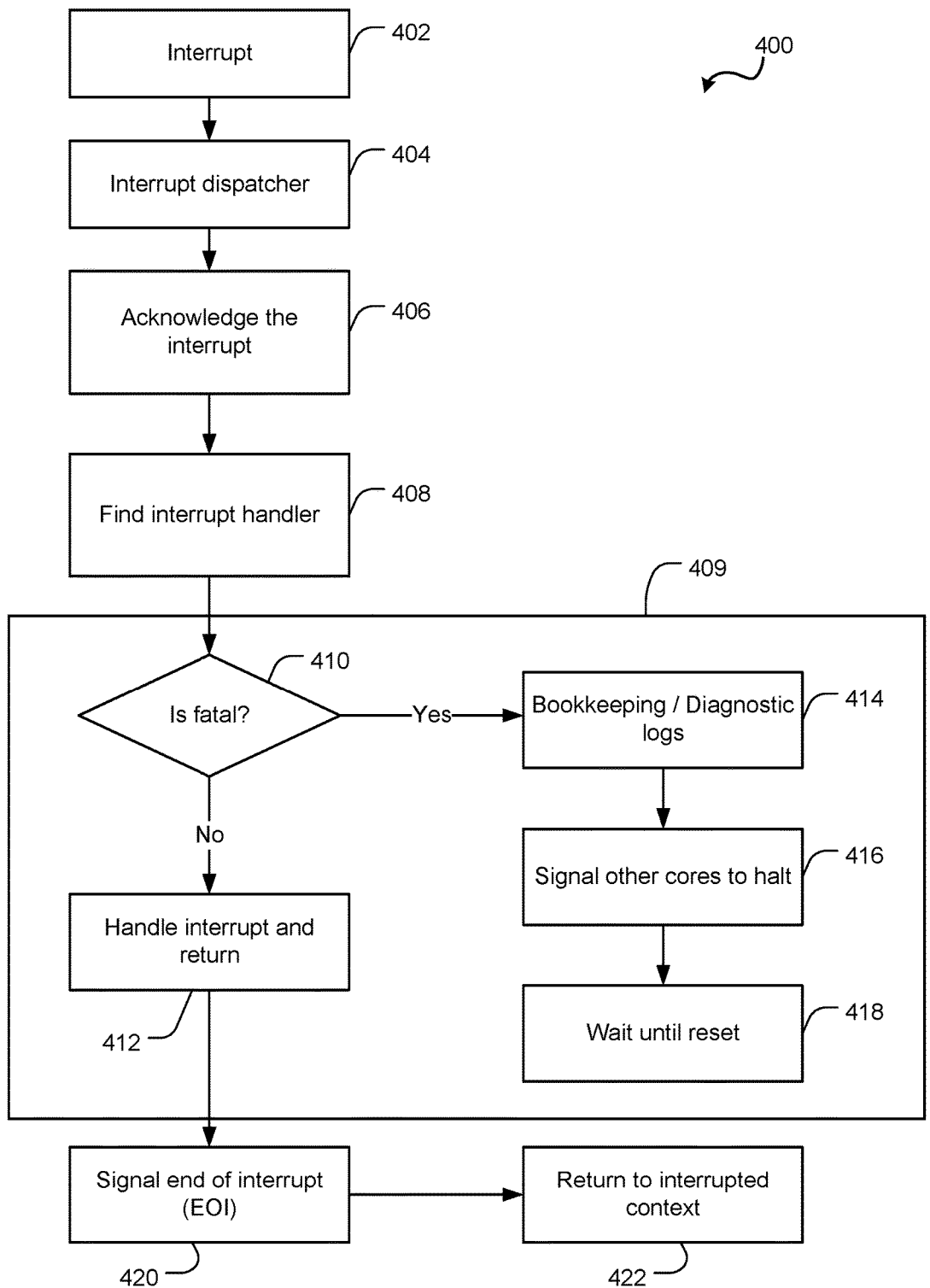
FIG. 4 is a flow diagram of an example process for handling an interrupt in a multiprocessor system.

Referring to FIG. 4, a flow diagram of an example process 400 for handling an interrupt in a multiprocessor system includes the stages shown. The process 400 is, however, an example only and not limiting. The process 400 can be altered, e.g., by having stages added, removed, rearranged, combined, performed concurrently and/or having stages split into multiple stages. The process 400 is an example of an interrupt handling framework executing on the multicore processor 110.

At stage 402 an interrupting event may occur within the hardware of a multiprocessor system. For example, one of the peripherals 206 may send an IRQ message to the interrupt controller 204. An interrupt handling framework including the interrupt controller 204 and a core 202a-d may execute an interrupt dispatcher algorithm at stage 404 and generate an acknowledgement message for the interrupt at stage 406. In an example, the acknowledgement may include an interrupt number and a corresponding CPU number based on the origin of the interrupt at stage 402. The CPU number may correspond to one of the cores 202a-d.

At stage 408, the interrupt handling framework may find a registered interrupt handler based on the origin of the interrupt and then dispatch that interrupt handler. For example, an interrupt handler 409 may include code to determine if the interrupt is fatal at stage 410. If the interrupt is non-fatal, then the interrupt handler 409 may address (i.e., handle) the interrupt at stage 412 and signal an end of interrupt (EOI) at stage 420. The affected core 2021-d may return to the interrupted context at stage 422. Thus, for a non-fatal interrupt, the process continues to execute. In contrast, if the interrupt is fatal at stage 410, the interrupt handler may perform some bookkeeping to update the appropriate diagnostic logs at stage 414. For example, the interrupt handler may update a file via the debug and trace module 210. At stage 416, the interrupt handler may signal the other cores 202a-d to halt execution. The multicore processor 110, including the cores 202a-d, may then be reset at stage 418. Since the process 400 may cause the reset of all the cores 202a-d, any interrupt handling that may be on the other cores may be reset in mid processing. Further, the process 400 is directed to hardware interrupts only. Software interrupts are not handled by the interrupt controller 204. When the cores 202a-d are reset at stage 418, and pending software interrupts are also stopped before the software can properly respond (e.g., log, address the interrupt) and return the process to the interrupted context.

Referring to FIGS. 5A-5E, a process 500 for handling concurrent fatal events in a multicore secure execution environment includes the stages shown. The process 500 is, however, an example only and not limiting. The process 500 can be altered, e.g., by having stages added, removed, rearranged, combined, performed concurrently and/or having stages split into multiple stages. The process 500 is an example of an interrupt handling framework executing on the multicore processor 110. In an embodiment, the computer system 100 may include processor executable instructions corresponding to the process 500 stored in the working memory 135, and the multicore processor 110 may be configured to execute the instructions.

At stage 502 an interrupting event may occur within the hardware of a multiprocessor system. For example, the first core 202a may experience a bus fault (e.g., NACK) error when attempting to communication with hardware that is not properly clocked and the first core 202a may send an IRQ to the interrupt controller 204. A stage 504, a software exception may generate as a software interrupt that may flow to the interrupt controller 204. For example, the second core 202b may be running on the secure side (e.g., the SEE) when a software assertion is noticed. The software assertion may create the software interrupt from a software exception. At stage 506, the interrupt controller 204 may dispatch an interrupt for the corresponding processor core. The interrupt dispatcher is configured to acknowledge the interrupt, find the interrupt handler, call the interrupt handler, signal EOI and return the respective processor core to the interrupted context. The interrupt dispatcher may generate an acknowledgement message for the interrupt at stage 508 (e.g., the acknowledgement may include an interrupt number and the corresponding CPU/processor number). At stage 510, the interrupt dispatcher is configured to find a registered interrupt handler based on the origin of the interrupt. At stage 512, the interrupt dispatcher determines if the interrupt can be fatal. For some interrupts, it is not known if it is fatal or not until the handler is actually dispatched. The handler may be configured to check hardware configuration/registers/syndromes to determine if the interrupt is actually fatal or not. If it cannot be a fatal interrupt or is not fatal, then the interrupt is handled at stage 520 and the interrupt dispatcher signals EOI at stage 522. If the interrupt can be fatal or is fatal, then the interrupt dispatcher is configured to acquire a fatal interrupt lock on the processor core at stage 514. The fatal interrupt lock is used to serialize the fatal event handling on the processor core. The interrupt dispatcher executes the interrupt handler found at stage 510 and then releases the fatal interrupt lock at stage 518. EOI is then signaled at 522.

At stage 524, the interrupt dispatcher determines if a fatal error has occurred (e.g., based on the interrupt handling). If no fatal errors occurred, then the processor core returns to the interrupted context at stage 526. If fatal errors did occur, the process 500 continues to the fatal interrupt handling loop on FIG. 5B.

Figure 5A:
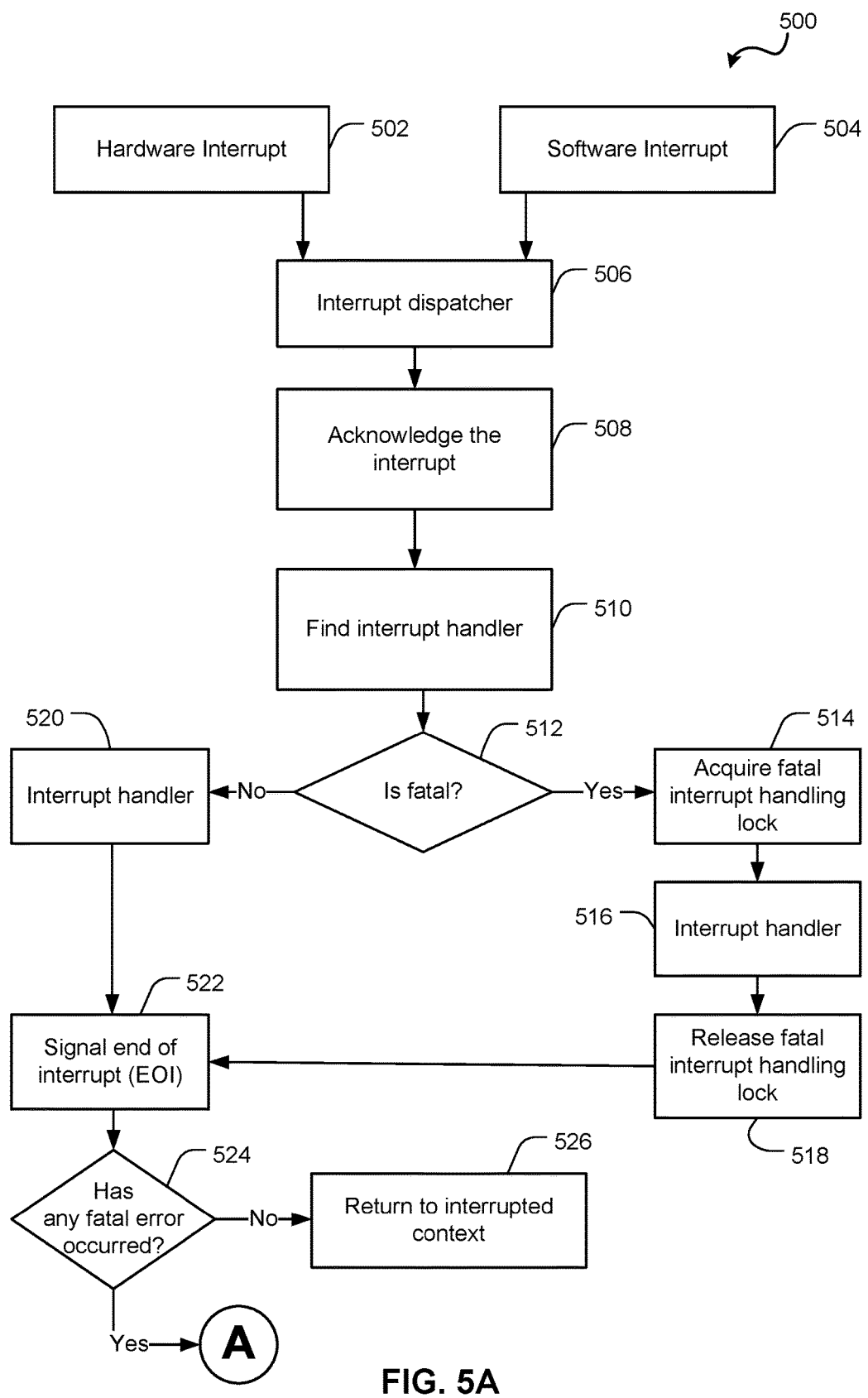
Figure 5B:
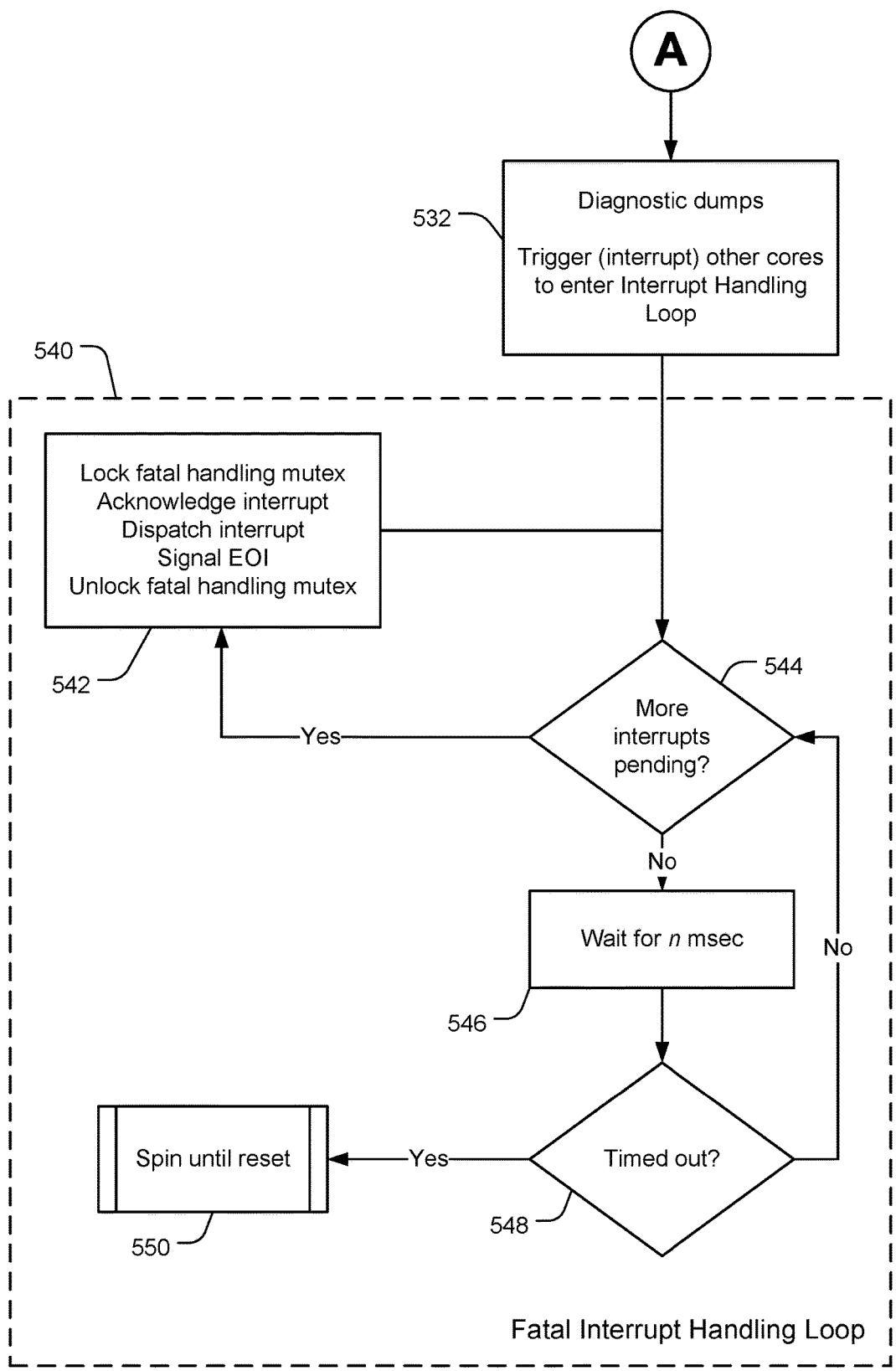

Referring to FIG. 5B, at stage 532, the interrupt handler is configured to execute some diagnostic dumps and bookkeeping processes. For example, the log files may be created or updated via the debug and trace module 210. On the first loop through the process 500 when a fatal error occurred (e.g., as determined at stage 524), the interrupt controller 204 is configured to interrupt the other cores 202a-d via a software interrupt at stage 504. This software interrupt will cause the other processor cores to also enter a fatal interrupt handling loop 540 and dump their diagnostic data at stage 532. In the fatal interrupt handling loop 540, a determination is made at stage 544 on whether there are more interrupts pending. If more interrupts are pending, then at stage 542 the interrupt controller 204 is configured to lock the fatal handling mutual exclusive access (mutex), acknowledge the interrupt, dispatch the appropriate interrupt handler, signal EOI and then unlock the fatal handling mutex. The mutual exclusive access is used to provide serialized fatal event handling between multiple threads/processor cores. By acquiring the mutex, a core can run a segment of code without causing synchronization issues with the other processor cores (e.g., it is a method of serializing the execution of the code). The fatal interrupt handling loop 540 may loop through stages 544 and 542 if there are more pending interrupts. If there no more interrupts pending at stage 544, then the interrupt controller 204 is configured wait for some amount of time (n msec) at stage 546 (e.g., 0.5, 1, 2, 5 msec). A determination is made at stage 548 to determine if the loop as has timed out (e.g., 2, 5, 10 msec). If the loop has timed out, then the respective processor core is instructed to enter a spin state until the device is reset by the watchdog timer.

Referring to FIG. 5C, an interrupt handler process 560 includes the stages shown. The interrupt handler process 560 is a component of an interrupt handling framework. At stage 562, the interrupt dispatcher is configured to dispatch the interrupt handler (e.g., stages 516, 520). At stage 564, the interrupt handler handles the corresponding interrupt and it returns to the dispatcher, so that dispatcher can dispatch more fatal errors. Referring to FIG. 5D, a software exception process 570 includes the stages shown. The software exception process 570 is a component of an interrupt handling framework. At stage 572, a software exception on one of the core 202a-d is provided to the interrupt controller 204 (e.g., at stage 504) such that the software exception will cause an interrupt the current core at stage 574. A software interrupt at stage 504 causes the process 500 to continue to execute such that a fatal error caused by software exceptions may be serialized and handled in the same way as hardware exceptions. Referring to FIG. 5E, an interrupt dispatcher process 580 includes the stages shown. The interrupt dispatcher process 580 is a component of an interrupt handling framework. At stage 582, the interrupt dispatcher is configured to communicate with the interrupt controller 204 to identify an interrupt number. At stage 584, the interrupt dispatcher is configured to dispatch an interrupt handler corresponding to the interrupt number. For example, the interrupt dispatcher may cause the interrupt handler process 560 to execute on one of the cores 202a-d. At stage 586, after the interrupt handler process 560 is complete, the interrupt dispatcher is configured to signal end of interrupt (EOI).

The process 500 provides the advantage of allowing code executing on the processor cores to pause when a fatal event occurs on one of the cores. The process 500 significantly improves the ability to debug a multicore application. For example, as soon as a fatal event happens, the other processing cores will stop executing and trap into the process 500 (e.g., via the software interrupt 504). The trap allows for the logging of the execution state of each core as close as possible to state of the core at the time of the fatal event. This log information allows for a more efficient debugging process. In a SEE, one processor core (e.g., 202a) may be in the secure side while the other cores (e.g., 202b-d) are executing code on a non-secure side (e.g., the HLOS). If the HLOS is executing on different cores, by stopping the execution on the other cores via the process 500, the diagnostic logs will reflect a closer state of the processor when a fatal event occurs.

In operation, in an example, the interrupt handling framework including the interrupt controller 204 and/or the working memory 135 may include computer-readable code for executing the process 500. As an example, and not a limitation, the code may include one or more instructions such as indicated in the following sections of pseudocode:

The following pseudocode will execute when a software generated fatal event occurs:
Trigger software generated interrupt with software fatal event context
Return The following pseudocode will execute when an interrupt context of any core 202a-d occurs:

```
if (fatal event)
{
    Acquire fatal event lock
    Dispatch fatal event handler
    Release fatal event lock
    if (the first fatal event)
```

-continued

```
{
    Inform other CPU's to save their context before device
    reset.
}
Go to fatal event handler loop
}
```

The following pseudocode will execute as a fatal event handler loop of any core 202a-d:

```
while (loop time is not expired)
{
    Read Next fatal event
    Acquire fatal event lock
    Dispatch fatal event handler
    Release fatal event lock
    wait 1 msec
    Decrements loop time by 1 msec
}
wait till device is reset
```

Figure 6:
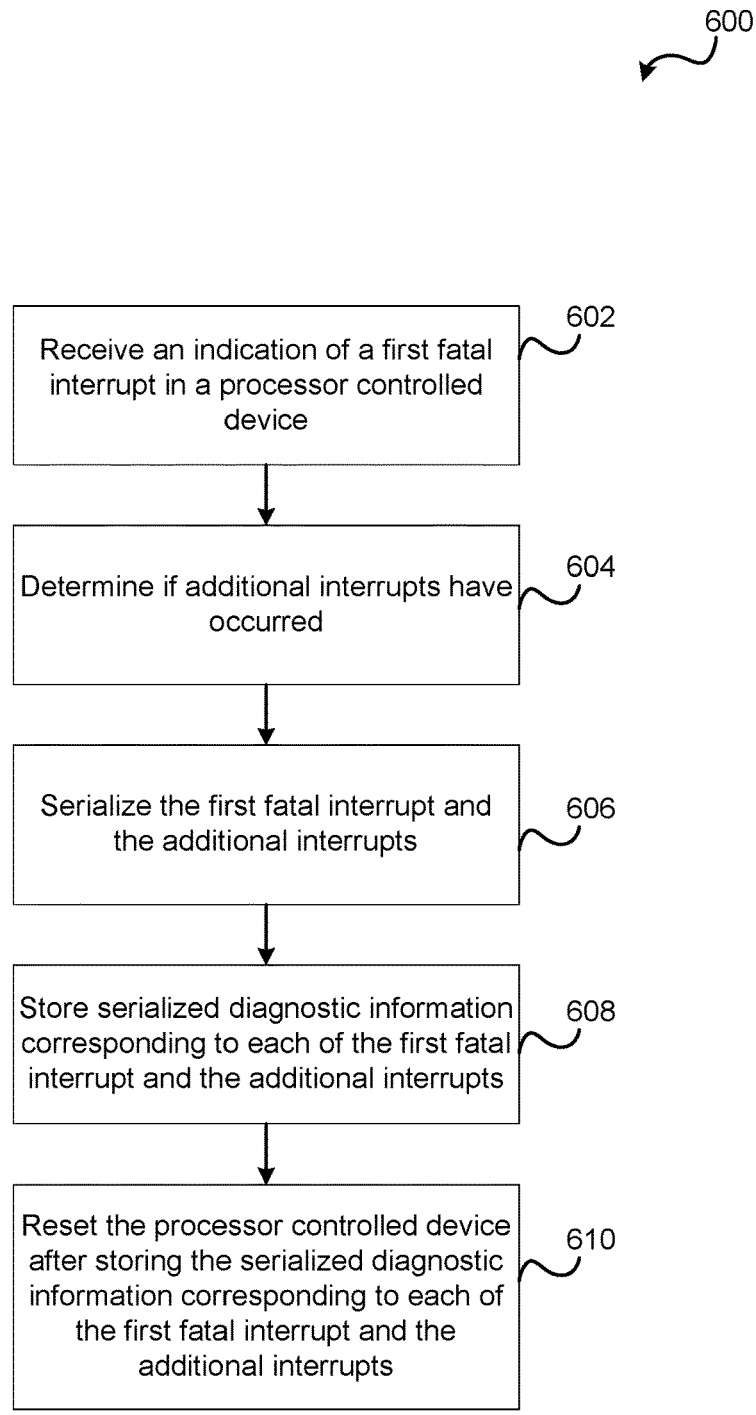
FIG. 6 is a flow diagram of an example process resetting a processor controlled device.

The following pseudocode will execute as generic fatal event handler:
Save symptoms in diagnostic buffers
Bookkeeping and cleanup of the event
Return Referring to FIG. 6, with further reference to FIGS. 1-5D, a method 600 for resetting a processor controlled device includes the stages shown. The method 600 is, however, an example only and not limiting. The method 600 can be altered, e.g., by having stages added, removed, rearranged, combined, performed concurrently and/or having stages split into multiple stages. In an embodiment, the computer system 100 is a processor controlled device and may include processor executable instructions corresponding to the method 600 stored in the working memory 135, and the multicore processor 110 may be configured to execute the instructions.

At stage 602, the method includes receiving an indication of a first fatal interrupt in a process controlled device. The multicore processor 110 may include an interrupt controller 204 as a means for receiving the indication of a first fatal interrupt. The first fatal interrupt may be received as a hardware interrupt request from either a secure or a non-secure environment in the computer system 100 (e.g., a IRQ or FIQ respectively). The first fatal interrupt may be a hardware interrupt or a software interrupt based on a software exception thrown from one of the cores 202a-d. In an example use case, the first core 202a may be executing instructions within the SEE and the code flow may detect a fatal software assertion. The fatal software assertion may be provided to the interrupt controller 204 at stage 504.

At stage 604, the method includes determining if additional interrupts have occurred. An interrupt framework executing on a core 202a-d, and interfacing the interrupt controller 204, may execute an interrupt dispatcher algorithm as a means for determining if additional interrupts have occurred. Referring to FIG. 5B, the indication of the first fatal interrupt received at stage 602 may cause the interrupt framework to execute the fatal interrupt handling loop 540. The interrupt framework may determine if other interrupt dispatchers are executing on the cores 202a-d. Continuing the example use case above, the second core 202b may be executing a thread on the HLOS and may encounter an access violation (e.g., as when attempting to gain access to a secure memory without the proper credentials). This access violation may cause a fatal interrupt on the second core 202b. At the same time, the third core 202c may encounter a bus fault when it attempts to communicate with a hardware component (e.g., a clocking error). The interrupt framework (e.g., via an interface with the interrupt controller 204) is configured to determine that the two additional interrupts (e.g., the access violation on the second core 202b, and the bus error on the third core 202c) have occurred.

At stage 606, the method includes serializing the first fatal interrupt and the additional interrupts. The interrupt framework, including the fatal interrupt handling loop 540, is a means for serializing the interrupts. Referring to FIG. 5B, the fatal interrupt handling loop 540 is configured to lock the fatal handling mutex, acknowledge the interrupt, dispatch the interrupt, signal end-of-interrupt, and then unlock the fatal handling mutex for each interrupt at stage 542. By acquiring the fatal handling mutex for each interrupt, the fatal interrupt handling loop 540 ensures that each processor core can dispatch the corresponding interrupt without causing a synchronization issue with the other processing cores. Using the mutual exclusive access (mutex) functionality of the interrupt controller 204 is an example of serializing the first interrupt and the additional interrupts.

At stage 608, the method includes storing serialized diagnostic information corresponding to each the first fatal interrupt and the additional interrupts. The interrupt framework and the debug and trace module 210 are a means for storing the serialized diagnostic information corresponding to each the first fatal interrupt and the additional interrupts. The serialized diagnostic data is complete and in order per each handler (i.e., not interleaved), and reflects all of the fatal errors that the system experienced. The diagnostic information may include CPU context information and other hardware configuration information which is relevant to a fatal event. In an example, an Access Control (AC) violation interrupt will be dispatched to the AC violation handler. This handler will interface with the AC hardware and is configured to gather diagnostic information such as what hardware made the AC violation (e.g., GPU, core, modem, etc.), what permissions does the hardware have, what address was trying to be accessed, a global AC configuration data, and other information related to the event. In general, the diagnostic information provides a picture of the processor and relevant hardware at the time of the fatal event, and potentially an indication of why the fatal event occurred. Continuing the example use case above, each core 202a-d performs a diagnostic dump at stage 532. The diagnostic dump may include creating or updating a log file via the debug and trace module 210. Since each core 202a-d enters the fatal interrupt handling loop individually, the diagnostic logs may also include the information associated with the interrupts on each core (e.g., the interrupt number and processor number included in the acknowledgement at stage 508).

At stage 610, the method includes resetting the processor controlled device after storing the serialized diagnostic information corresponding to each of the first fatal interrupt and the additional interrupts. The interrupt handling framework is a means for resetting the processor controlled device. Each core 202a-d flows through the fatal interrupt handling loop 540 and will enter a spin state at stage 550 after a delay time (e.g., stages 546, 548). The delay provides the opportunity for the interrupt handling framework, and the corresponding interrupt handlers, to perform the diagnostics dump at stage 532. Once each core 202a-d reaches the spin state at stage 550, a watchdog timer on the multicore processor 110 will timeout and then reset the device to recover from the fatal interrupt received at stage 602.

The computer system 100 may be a SoC, or some elements of the computer system 100 may be deployed on a SoC to perform methods in accordance with various embodiments described herein. According to a set of embodiments, some or all of the procedures of such methods are performed by a SoC including structures similar to the computer system 100. The multicore processor 110 may execute one or more sequences of one or more instructions (which might be incorporated into the stored HLOS 140 and/or other code, such as in the trusted zone 142 or an application program 145) contained in the working memory 135. Such instructions may be read into the working memory 135 from another computer-readable medium, such as one or more of the storage device(s) 125. Merely by way of example, execution of the sequences of instructions contained in the working memory 135 might cause one or more elements in the multicore processor 110 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 100, various computer-readable media might be involved in providing instructions/code to multicore processor 110 for execution and/or might be used to store and/or carry such instructions/code (e.g., as signals). The working memory 135 may be a non-transitory processor-readable storage medium comprising processor-readable instructions configured to cause a processor controlled device to handle interrupts such as process 500. In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 125. Volatile media include, without limitation, dynamic memory, such as the working memory 135. Transmission media include, without limitation, coaxial cables, copper wire and fiber optics, including the wires that comprise the bus 105, as well as the various components of the communications subsystem 130 (and/or the media by which the communications subsystem 130 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, eMMC, any other memory chip or cartridge, a carrier wave as described hereinafter, or any other medium from which a computer can read instructions and/or code.

Various forms of computer-readable media may be involved in carrying one or more sequences of one or more instructions to the multicore processor 110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 130 (and/or components thereof) generally will receive the signals, and the bus 105 then might carry the signals (and/or the data, instructions, etc. carried by the signals) to the working memory 135, from which the multicore processor 110 retrieves and executes the instructions. The instructions received by the working memory 135 may optionally be stored on a storage device 125 either before or after execution by the multicore processor 110.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for handling interrupts in a processor controlled device, comprising:

receiving an indication of a first fatal interrupt associated with a first core of a multicore processor of the processor controlled device;
triggering additional interrupts on other cores of the multicore processor to cause the other cores to execute a fatal interrupt handling process;
serializing the handling of the first fatal interrupt and the additional interrupts;
storing a serialized diagnostic information corresponding to each of the first fatal interrupt and the additional interrupts; and
resetting the processor controlled device after storing the serialized diagnostic information corresponding to each of the first fatal interrupt and the additional interrupts.

2. The method of claim 1 wherein the first fatal interrupt is a hardware interrupt.

3. The method of claim 1 wherein the first fatal interrupt is a software exception.

4. The method of claim 1 wherein each of the plurality of cores is placed in a spin state prior to resetting the processor controlled device.

5. The method of claim 1 wherein storing the serialized diagnostic information corresponding to each of the first fatal interrupt and the additional interrupts includes storing the serialized diagnostic information for each of the plurality of cores.

6. The method of claim 5 wherein the serialized diagnostic information includes an interrupt number and a processor number.

7. A system for handling a fatal interrupt in a multicore processor, comprising:
a memory;
a plurality of cores;
an interrupt controller operably coupled to the memory and each of the plurality of cores, wherein at least one of the plurality of cores and the interrupt controller are configured to:
receive an indication of a first fatal interrupt associated with a first core of the plurality of cores;
trigger additional interrupts on other cores of the multicore processor to cause the other cores to execute a fatal interrupt handling process;
serialize the handling of the first fatal interrupt and the additional interrupts;
store a serialized diagnostic information corresponding to each of the first fatal interrupt and the additional interrupts in the memory; and
reset the multicore processor after the serialized diagnostic information corresponding to each of the first fatal interrupt and the additional interrupts is stored in the memory.

8. The system of claim 7 wherein the first fatal interrupt is a hardware interrupt.

9. The system of claim 7 wherein the first fatal interrupt is a software exception.

10. The system of claim 7 wherein each of the plurality of cores is placed in a spin state prior to resetting the multicore processor.

11. The system of claim 7 further comprising a debug and trace module configured to store the serialized diagnostic information corresponding to each of the first fatal interrupt and the additional interrupts for each of the plurality of cores.

12. The system of claim 7 wherein the serialized diagnostic information includes an interrupt number and a processor number.

13. An apparatus for handling interrupts in a processor controlled device, comprising:
means for receiving an indication of a first fatal interrupt associated with a first core of a multicore processor of the processor controlled device;
means for triggering additional interrupts on other cores of the multicore processor to cause the other cores to execute a fatal interrupt handling process;
means for serializing the handling of the first fatal interrupt and the additional interrupts;
means for storing a serialized diagnostic information corresponding to each of the first fatal interrupt and the additional interrupts; and
means for resetting the processor controlled device after storing the serialized diagnostic information corresponding to each of the first fatal interrupt and the additional interrupts.

14. The apparatus of claim 13 wherein the first fatal interrupt is a hardware interrupt.

15. The apparatus of claim 13 wherein the first fatal interrupt is a software exception.

16. The apparatus of claim 13 wherein each of the plurality of cores is placed in a spin state prior to resetting the processor controlled device.

17. The apparatus of claim 13 wherein the means for storing the serialized diagnostic information corresponding to each of the first fatal interrupt and the additional interrupts includes means for storing the serialized diagnostic information for each of the plurality of cores.

18. A non-transitory processor-readable storage medium comprising processor-readable instructions configured to cause a processor controlled device to handle interrupts, comprising:
code for receiving an indication of a first fatal interrupt associated with a first core of a multicore processor of the processor controlled device;
code for triggering additional interrupts on other cores of the multicore processor to cause the other cores to execute a fatal interrupt handling process;
code for serializing the handling of the first fatal interrupt and the additional interrupts;
code for storing a serialized diagnostic information corresponding to each of the first fatal interrupt and the additional interrupts; and
code for resetting the processor controlled device after storing the serialized diagnostic information corresponding to each of the first fatal interrupt and the additional interrupts.

19. The storage medium of claim 18 wherein the first fatal interrupt is a hardware interrupt.

20. The storage medium of claim 18 wherein the first fatal interrupt is a software exception.

21. The storage medium of claim 18 wherein each of the plurality of cores is placed in a spin state prior to resetting the processor controlled device.

22. The storage medium of claim 18 wherein the code for storing the serialized diagnostic information corresponding to each of the first fatal interrupt and the additional interrupts includes code for storing the serialized diagnostic information for each of the plurality of cores.

23. The storage medium of claim 22 wherein the serialized diagnostic information includes an interrupt number and a processor number.

* * * * *